United States Patent
Liu

(10) Patent No.: US 12,296,268 B2
(45) Date of Patent: May 13, 2025

(54) PREDICTIVE DISPLAY OF THROWN PROJECTILE

(71) Applicant: Tencent Technology (Shenzhen) Company Limited, Shenzhen (CN)

(72) Inventor: Bojun Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/484,093

(22) Filed: Oct. 10, 2023

(65) Prior Publication Data

US 2024/0033636 A1 Feb. 1, 2024

Related U.S. Application Data

(63) Continuation of application No. 17/081,508, filed on Oct. 27, 2020, now Pat. No. 11,819,763, which is a
(Continued)

(30) Foreign Application Priority Data

Aug. 2, 2018 (CN) .......................... 201810870034.4

(51) Int. Cl.
*A63F 13/573* (2014.01)
*A63F 13/53* (2014.01)
(Continued)

(52) U.S. Cl.
CPC ............ *A63F 13/573* (2014.09); *A63F 13/53* (2014.09); *G06F 3/011* (2013.01); *G06T 7/246* (2017.01);
(Continued)

(58) Field of Classification Search
CPC ...... A63F 13/426; A63F 13/52; A63F 13/525; A63F 13/5255; A63F 13/53;
(Continued)

(56) References Cited

U.S. PATENT DOCUMENTS 6,336,864 B1 * 1/2002 Nakanishi ............. A63F 13/803
463/31
2016/0250559 A1 9/2016 Sogabe et al.
(Continued)

FOREIGN PATENT DOCUMENTS

CN 1173379 A 2/1998
CN 101110173 A 1/2008
(Continued)

OTHER PUBLICATIONS

"Tom Clancy's The Division". From Wikipedia. [online], [retrieved on Mar. 23, 2022]. Retrieved from the Internet <URL:https://en.wikipedia.org/w/index.php?title=Tom_Clancy%27s_The_Division&oldid=849088761>. 5 pages. (Year: 2018).*
(Continued)

*Primary Examiner* — Lawrence S Galka
(74) *Attorney, Agent, or Firm* — Crowell & Moring LLP

(57) ABSTRACT

Embodiments of this disclosure describe a method and an apparatus for controlling a virtual object to interact with a projectile. The method includes: determining a shooting direction of a camera of the virtual scene as a throwing direction of a projectile controlled by the virtual object; determining a motion trajectory of the projectile according to an initial position, the throwing direction, an initial throwing speed of the projectile, and a motion law of an object under an influence of gravity acceleration, so that the motion trajectory conforms to the motion law; displaying, in the virtual scene, the motion trajectory; adjusting the shooting direction of the camera of the virtual scene, to obtain an adjusted throwing direction of the projectile; updating the motion trajectory of the projectile based on the adjusted throwing projectile; and displaying, in the virtual scene, an updated motion trajectory.

20 Claims, 9 Drawing Sheets

Related U.S. Application Data continuation of application No. PCT/CN2019/096602, filed on Jul. 18, 2019.

(51) Int. Cl.
  *G06F 3/01* (2006.01)
  *G06T 7/246* (2017.01)
  *G06T 7/73* (2017.01)

(52) U.S. Cl.
  CPC ...... *G06T 7/73* (2017.01); *G06T 2207/30241* (2013.01)

(58) Field of Classification Search
  CPC .... A63F 13/533; A63F 13/5375; A63F 13/56; A63F 13/57; A63F 13/577; A63F 13/837; G06T 2207/30241; G06T 2210/21
  See application file for complete search history.

(56) References Cited

U.S. PATENT DOCUMENTS

| | | | |
|---|---|---|---|
| 2017/0151484 A1 | 6/2017 | Reilly et al. | |
| 2017/0216729 A1* | 8/2017 | Onishi | A63F 13/812 |
| 2018/0345148 A1* | 12/2018 | Matsumiya | A63F 13/837 |

FOREIGN PATENT DOCUMENTS

| | | | |
|---|---|---|---|
| CN | 101898042 A | 12/2010 | |
| CN | 105597315 A | 5/2016 | |
| CN | 106621312 A | 5/2017 | |
| CN | 107158701 A | 9/2017 | |
| CN | 108037827 A | 5/2018 | |
| CN | 109200582 A | 1/2019 | |
| JP | 2005-87325 A | 4/2005 | |
| JP | 2015-196042 A | 11/2015 | |

OTHER PUBLICATIONS

"The Division How to Throw Grenades" [online], [retrieved Mar. 23, 2022]. Retrieved from the Internet <URL https://www.youtube.com/watch?v=jxuebwq1pFw>. 1 page. (Year: 2016).*

"The Division Guide: How". From attackofthefanboy.com via The Way Back Machine. [online], [retrieved on Mar. 23, 2022]. Retrieved from the Internet <URL: https://web.archive.org/web/20160430235131/http://attackofthefanboy.com/guides/division-guide-throw-grenade>. 1 page. (Year: 2016).*

"Guide: How to Properly throw Grenades in PlayerUnknown's Battlegrounds (PUBG)" [online], [retrieved Mar. 6, 2023]. Retrieved from the Internet <URL https://www.youtube.com/watch?v=Mn3uR4bzfSk>. 1 page. V (Year: 2017).*

International Search Report and Written Opinion with English Translation for International Application No. PCT/CN2019/096602 dated Oct. 9, 2019; 13 pages.

Office Action for Chinese Patent Application No. 201810870034.4 dated Oct. 11, 2019; 9 pages.

Office Action for Chinese Patent Application No. 201810870034.4 dated Dec. 9, 2019, 6 pages.

Japanese Office Action with English Translation of Notice of Reasons for Refusal for Japanese Patent Application No. 2021-510519 dated Dec. 28, 2021, 10 pages.

Scott Rogers, "Level up" Game Design, first edition, Omorea Japan, Jan. 22, 2012, p. 271 to 275, pp. 08 to.

"Metal Gear Solid Peace Walker", Electric Shock, vol. 2, Nihon, ASC11 Media Works, Dec. 1, 2009, vol. 9, No. 22, pp. 24-31 (documents showing well-known arts).

WackyJacky101, "Guide: How to Properly throw Grenades in PlayerUnknown's Battlegrounds(PUBG)", Oct. 21, YouTube [online] [video], 2017, and in particular, refer to pp. 1:02 to 1:18, and 3"43 to 4:19. https://www.youtube.com/watch?v=Mn3uR4bzfSk.

David M. Bourg, introduction of Physical simulation for the development of game, first edition, Ohmssha Co., Ltd., Jan. 25, 2003, pp. 1 to 2, 34 (documents showing well-known arts), pp. 07 to 44 (well-known arts).

Basica knowledge of the physical knowledge of Tanijiri Yoshini, Tanijiri Dorcule, and a game, first edition, Japan, Kabushiki Kaisha, Jan. 25, 2011, pp. 71 to 86, 104 (documents showing well-known arts), pp. 02 to, and 106 (documents showing well-known arts).

Japanese Office Action with English Translation of Notice of Reasons for Refusal for Japanese Patent Application No. 2021-510519 dated Aug. 29, 2022, 11 pages.

"[PUBG mobile] "throw—beginner escape"—the $5^{th}$ time [from the PUBG mobile lecture—which does not know that it is unexpected", and ****** Yamada ] you, game beginners,—[online], Jun. 8, 2018, http://blog.livedoor.jp/twentyyamada-pubgm/archives/984874.html and [Aug. 29, 2022 search].

[PUBG Mobile] the smart phone version—at last—appearance! [ an operation method ] [ check and ] That is saw, YouTube [online] [video], May 16, 2018, https://www.youtube.com/watch?v=jX0n09lmHk, [Aug. 29, 2022 search].

"Tom Clancy's The Divison", https://en.wikipedia.org/w/index.php?title=Tom_Clancy%27s_The_Division&oldid=849088761, retrieved on Mar. 23, 2022, 5 pages, 2018.

"The Division How to Throw Grenades", https://www.youtube.com/watch?v=jxuebwq1pFw, retrieved on Mar. 23, 2022, 1 page, 2016.

"The Division Guide: How," https://web.archive.org/web/20160430235131/http://attackofthefanboy.com/guides/division-guide-throw-grenade, retrieved on Mar. 23, 2022, 1 page, 2016.

"Guide: How to Properly throw Grenades in PlayerUnknown's Battlegrounds (PUBG)", https://www.youtube.com/watch?v=Mn3uR4bzfSk, 1 page, 2017.

* cited by examiner

PREDICTIVE DISPLAY OF THROWN PROJECTILE

RELATED APPLICATION

This application is based on and claims the benefit of priority to U.S. Non-Provisional application Ser. No. 17/081,508, filed Oct. 27, 2020, which is a continuation application of the International PCT Application No. PCT/CN2019/096602, filed with the China National Intellectual Property Administration, PRC on Jul. 18, 2019 which claims priority to Chinese Patent Application No. 201810870034.4, entitled "METHOD AND APPARATUS FOR CONTROLLING VIRTUAL OBJECT TO INTERACT WITH PROJECTILE, AND STORAGE MEDIUM" and filed with the China National Intellectual Property Administration, PRC on Aug. 2, 2018, which are incorporated herein by reference in their entireties.

FIELD OF THE TECHNOLOGY

Embodiments of this disclosure relate to the field of computer technologies, and in particular, to a method, an apparatus, and a storage medium for controlling a virtual object to interact with a projectile.

BACKGROUND OF THE DISCLOSURE

With rapid development of computer technologies and popularization of smart terminals, video games have been widely used. A video game can provide a virtual scene in which virtual items are displayed. A user may control, through a terminal, a virtual object to interact with the virtual items. A projectile is a commonly used virtual item. The user may control the virtual object to pick up the projectile and to perform a throwing operation on the projectile.

To help the user to control a motion trajectory of the projectile, after the user controls the virtual object to pick up the projectile but before the throwing operation is performed on the projectile, the terminal may use a position of the projectile as an initial position of the motion trajectory, and use a shooting direction of a camera of the virtual scene as a throwing direction of the projectile. A ray is drawn from the initial position along the throwing direction. An intersection of the ray and an obstacle in the virtual scene is used as an end position of the motion trajectory. A straight line connecting the initial position and the end position is used as the motion trajectory of the projectile. The motion trajectory may be shown in FIG. 1. Subsequently, the terminal displays, in the virtual scene, the motion trajectory, so that the user can learn of the motion trajectory of the projectile before performing the throwing operation on the projectile and then determine whether to adjust the throwing direction of the projectile.

In the process of implementing the embodiments of this disclosure, it is found by the inventor that the related art has at least the following problems. In the related art, the influence of gravity on the motion trajectory of the projectile is not considered, and consequently, the determined motion trajectory does not conform to a motion law of an object under the influence of gravity acceleration. Therefore, accuracy is poor and an effect of simulating a real scene may not be achieved.

SUMMARY

Embodiments of this disclosure provide a method and an apparatus for controlling a virtual object to interact with a projectile, and a storage medium, to resolve a problem of poor accuracy of a motion trajectory in the related art. In this disclosure, a projectile is referred to as any object that may be thrown, such as a grenade, a gasoline bomb, a shock bomb, a rock, a missile, or the like. The technical solutions are as follows:

According to an aspect, a method for controlling a virtual object to interact with a projectile is provided. The method includes:

controlling the virtual object to pick up the projectile in a virtual scene;

determining a position of the projectile as an initial position, and determining a shooting direction of a camera of the virtual scene as a throwing direction of the projectile;

determining a motion trajectory of the projectile according to the initial position, the throwing direction, an initial throwing speed of the projectile, and a motion law of an object under an influence of gravity acceleration, so that the motion trajectory is a curve conforming to the motion law; and displaying, in the virtual scene, the motion trajectory.

According to an aspect, an apparatus for controlling a virtual object to interact with a projectile is provided. The apparatus includes:

a pickup module, configured to control the virtual object to pick up the projectile in a virtual scene;

a parameter determining module, configured to determine a position of the projectile as an initial position, and determine a shooting direction of a camera of the virtual scene as a throwing direction of the projectile;

a trajectory determining module, configured to determine a motion trajectory of the projectile according to the initial position, the throwing direction, an initial throwing speed of the projectile, and a motion law of an object under the influence of gravity acceleration, so that the motion trajectory is a curve conforming to the motion law; and a display module, configured to display, in the virtual scene, the motion trajectory.

According to an aspect, a terminal for controlling a virtual object to interact with a projectile is provided. The terminal includes a processor and a memory. The memory stores at least one instruction, at least one program, a code set, or an instruction set. The instruction, the program, the code set, or the instruction set is loaded by the processor to implement the following operations:

controlling the virtual object to pick up the projectile in a virtual scene;

determining a position of the projectile as an initial position, and determining a shooting direction of a camera of the virtual scene as a throwing direction of the projectile;

determining a motion trajectory of the projectile according to the initial position, the throwing direction, an initial throwing speed of the projectile, and a motion law of an object under the influence of gravity acceleration, so that the motion trajectory is a curve conforming to the motion law; and displaying, in the virtual scene, the motion trajectory.

According to an aspect, a computer-readable storage medium is provided. The computer-readable storage medium stores at least one instruction, at least one program, a code set, or an instruction set. The instruction, the program, the code set, or the instruction set is loaded by a processor and has operations to implement the method for controlling a virtual object to interact with a projectile.

The technical solutions provided in the embodiments of this disclosure have at least the following beneficial effects:

According to the method, the apparatus, and the storage medium provided in the embodiments of this disclosure, the virtual object is controlled to pick up the projectile in the virtual scene, the position of the projectile is determined as the initial position, and the shooting direction of the camera of the virtual scene is determined as the throwing direction of the projectile; according to the initial position, the throwing direction, the initial throwing speed of the projectile, and the motion law of an object under the influence of gravity acceleration, the motion trajectory of the projectile is determined, so that the motion trajectory is a curve conforming to the motion law; and the motion trajectory is displayed in the virtual scene. The determined motion trajectory takes into account the influence of gravity, and conforms to the motion law of an object under the influence of gravity acceleration, so that accuracy is improved, and an effect of simulating a real scene can be achieved.

In addition, a plurality of preset moments are obtained and positions of the projectile at the preset moments are compared, so that a position where the projectile first hits an obstacle is determined as an end position of the motion trajectory. An accurate end position of the motion trajectory can be determined, and an effect of a thrown object hitting the obstacle can be simulated, making the scene more realistic and vivid.

In addition, when a user performs a direction adjustment operation, the throwing direction of the projectile can be adjusted according to the direction adjustment operation, and the motion trajectory of the projectile can be further adjusted, so that flexible adjustment of the motion trajectory is implemented and requirements of a user can be met.

BRIEF DESCRIPTION OF THE DRAWINGS

To describe the technical solutions of the embodiments of this disclosure more clearly, the following briefly describes the accompanying drawings required for describing the embodiments. Apparently, the accompanying drawings in the following description show only some embodiments of this disclosure, and a person of ordinary skill in the art may still derive other accompanying drawings from the accompanying drawings without creative efforts.

DESCRIPTION OF EMBODIMENTS

Figure 1:
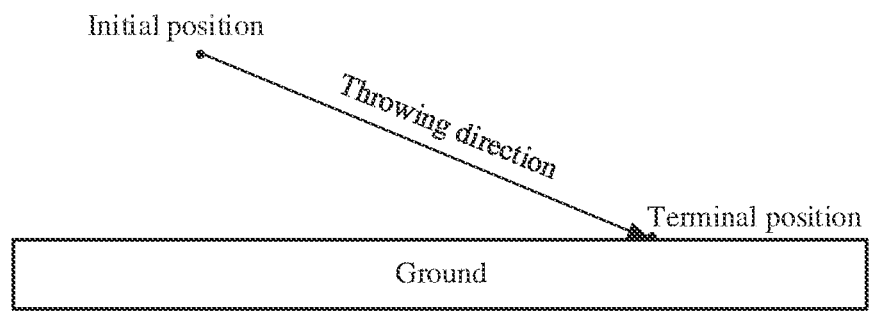
FIG. 1 is a schematic diagram of a motion trajectory of a projectile according to the related art.

The following clearly and comprehensively describes the technical solutions in the embodiments of this disclosure with reference to the accompanying drawings in the embodiments of this disclosure. Apparently, the described embodiments are some of embodiments of this disclosure rather than all of the embodiments. All other embodiments obtained by a person of ordinary skill in the art based on the embodiments of this disclosure without creative efforts shall fall within the protection scope of this application.

First, terms described in the embodiments of this disclosure are introduced as follows:

A virtual scene is a virtual environment displayed (or provided) when an application program is running on a terminal. The virtual environment may be a simulated environment of a real world, or may be a semi-simulated semi-fictional environment, or may be an entirely fictional environment. The virtual scene may be a two-dimensional virtual scene, or may be a three-dimensional virtual scene.

For example, the virtual scene may include the sky, the land, and the ocean, and the land may include environment elements such as a desert and cities. The virtual scene may further be used for simulating a real environment under a different weather, for example, a sunny day, a rainy day, a foggy day, or a dark night. The virtual scene may further include a virtual item. A virtual object may pick up the virtual item, throw the picked-up virtual item, or discard the picked-up virtual item.

A virtual object is a movable three-dimensional model in the virtual scene, and may be used for representing an image of a user. The virtual object may be in any form such as a virtual character, a virtual animal, and a cartoon character, for example, a character or an animal displayed in the virtual scene. Optionally, the virtual object may be a three-dimensional model created based on an animation skeleton technology in a three-dimensional virtual scene. Each virtual object has a shape and a volume in the three-dimensional virtual scene, and occupies some space in the three-dimensional virtual scene.

A virtual item is an item arranged in the virtual scene, and may be picked up, thrown or discarded by the virtual object. For example, the virtual item may be a piece of clothing, a helmet, a body armor, a medical product, a cold weapon or hot weapon, and the like, or may be a throwable projectile such as a grenade, a gasoline bomb, or a shock bomb.

A camera is a three-dimensional model located around the virtual object in the virtual scene. When a first-person viewing angle is used, the camera may be located around the head of the virtual object or in the head of the virtual object; when a third-person viewing angle is used, the camera may be located in rear of the virtual object, and the virtual scene is observed from a viewing angle of the camera.

A shooting direction of the camera is an observation direction when observation is performed from a first-person viewing angle or a third-person viewing angle of a virtual object in a virtual scene.

The terminal may use the first-person viewing angle for display. The displayed virtual scene includes only hands and arms of the virtual object, or a weapon held by the virtual object, to simulate an effect of observing the virtual scene through a viewing angle of the virtual object. Alternatively, the terminal may use the third-person viewing angle for display. The third-person viewing angle may be in the same direction as the first-person viewing angle, while in the third-person viewing angle, the virtual object facing away from the terminal screen is displayed in the virtual scene, so that the user can see actions and an environment of the controlled virtual object in the virtual scene.

The embodiments of this disclosure mainly relate to video games, for example, first-person shooter (FPS) games, real-time strategy (RTS) games, or multiplayer online battle arena (MOBA) games. The terminal may download and install a configuration file of a video game. The configuration file includes an application program, interface display data, or virtual scene data of the video game. When the user logs in to the video game on the terminal, the terminal renders and displays the virtual scene in the video game by invoking the configuration file. The user may perform a control operation on the terminal. After detecting the control operation, the terminal may determine game data corresponding to the control operation, and render and display the game data. The game data may include virtual scene data, behavior data of the virtual object in the virtual scene, and the like.

The user may control, through control operation, the virtual object to move in the virtual scene. Using a shooting game as an example, in the virtual scene, the user may control the virtual object to fall freely, glide, or fall after a parachute is opened in the sky; or to run, jump, creep, stoop and move forward on the land; or control the virtual object to swim, float, or dive in the ocean. Certainly, the user may further control the virtual object to ride in a vehicle to move in the virtual scene. The user may further control the virtual object to discover a virtual item in the virtual scene, and to pick up the virtual item in the virtual scene, to fight against another virtual object using the picked-up virtual item or to perform a throwing operation on the virtual item such as a projectile.

The user may control, through the control operation, the virtual object to rotate, and adjust the shooting direction of the camera, which is equivalent to adjusting a view-angle coverage of the virtual object. For example, the control operation may be a sliding operation. When detecting the sliding operation, the terminal may determine a rotation direction, a rotation angle, and a rotation speed of a viewing angle corresponding to the sliding operation based on a sliding direction, a sliding distance, and a sliding speed of the sliding operation. For example, the sliding direction of the sliding operation may correspond to the rotation direction of the viewing angle, and the sliding distance of the sliding operation and the rotation angle of the viewing angle may be positively correlated. The sliding speed of the sliding operation and the rotation speed of the viewing angle may be positively correlated.

Figure 2:
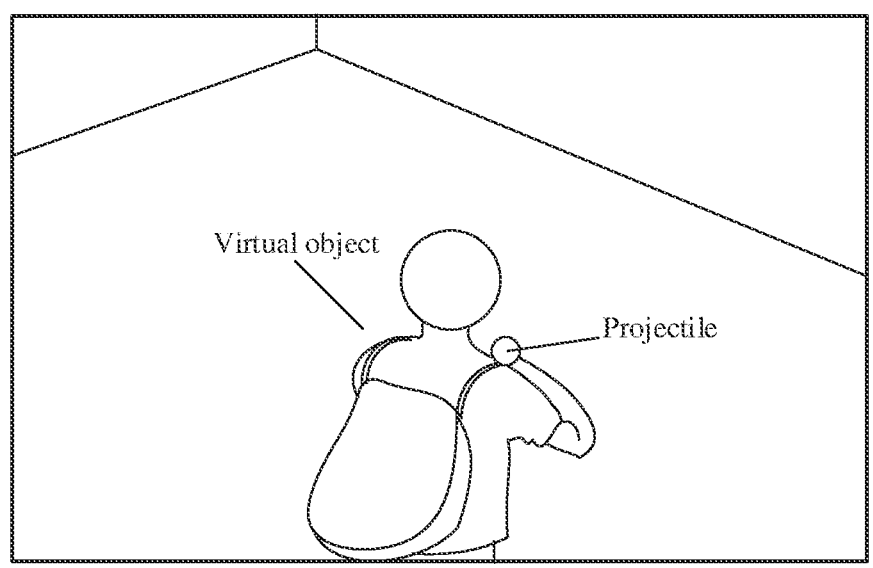
FIG. 2 is a schematic diagram of a virtual scene according to an embodiment of this disclosure.

FIG. 2 is a schematic diagram of a virtual scene according to an embodiment of this disclosure. Referring to FIG. 2, the terminal displays the virtual scene. The virtual scene includes a virtual object, and the virtual object holds a projectile in the hand.

Figure 3:
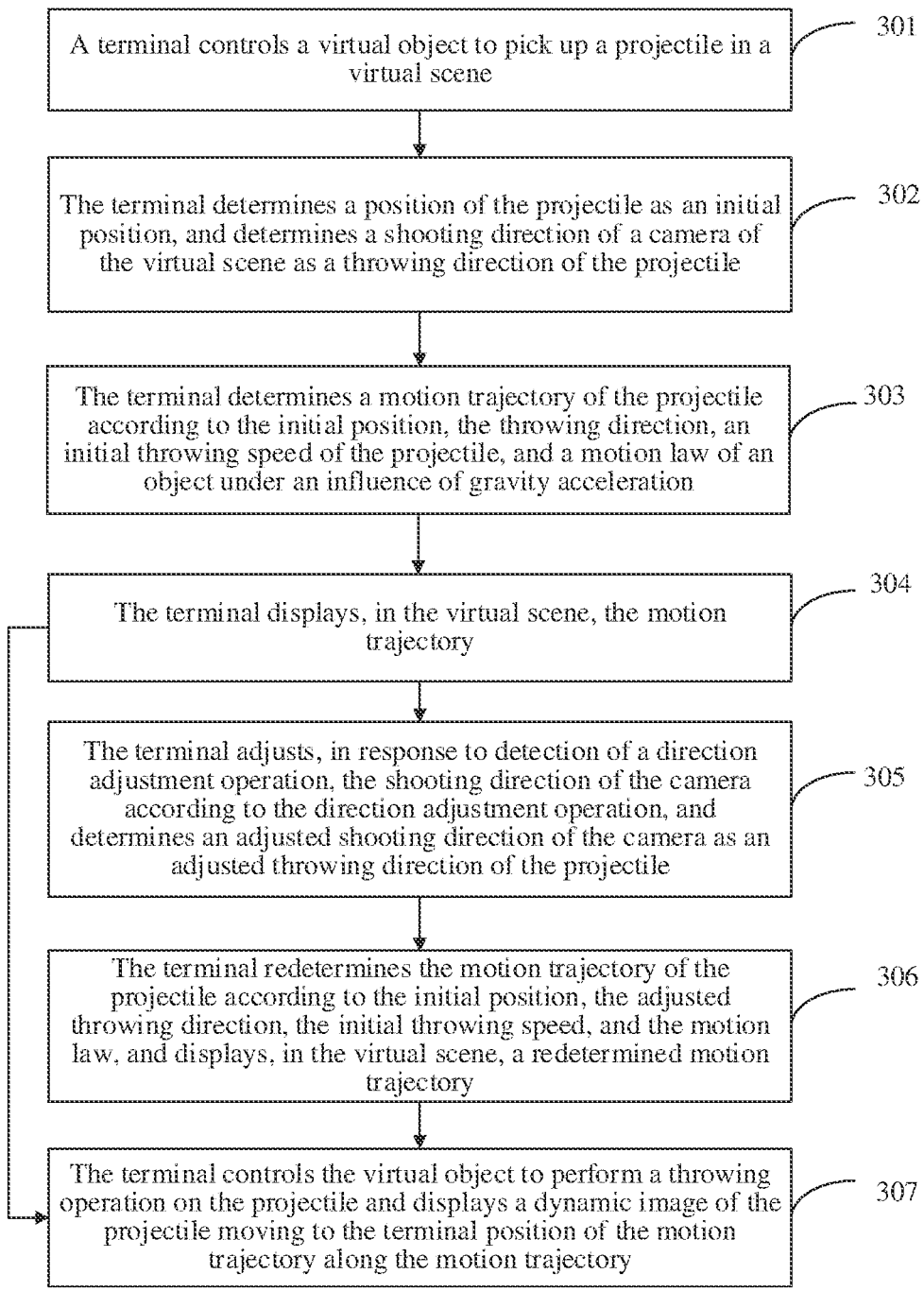
FIG. 3 is a flowchart of a method for controlling a virtual object to interact with a projectile according to an embodiment of this disclosure.

FIG. 3 is a flowchart of a method for controlling a virtual object to interact with a projectile according to an embodiment of this disclosure. The execution subject of this embodiment of this disclosure is a terminal. The terminal may be a device such as a mobile phone, a computer, a tablet computer, or a smart game console. The terminal can run an application program that supports a virtual scene. The application program may be a virtual reality application program, a three-dimensional map program, a military simulation game program, a FPS game program, a MOBA game program, or other application programs, or the like. Referring to FIG. 3, the method includes the following steps:

301. A Terminal Controls a Virtual Object to Pick Up a Projectile in a Virtual Scene.

In this embodiment of this disclosure, the terminal displays the virtual scene and displays various elements configured in the virtual scene. The elements may be environment elements such as sky and land, or virtual items such as clothing and projectiles. The projectile is a virtual item that may be picked up and thrown by the virtual object, such as a grenade, a gasoline bomb, a shock bomb, or the like.

The terminal may obtain configuration data of the virtual items. The configuration data of the virtual items may include types of the virtual items. For example, the configuration data may define virtual items such as grenade, gasoline bomb, and shock bomb are types of projectiles. For such projectiles, the terminal may control the virtual object to perform at least one of a pickup operation or a throwing operation.

Figure 4:
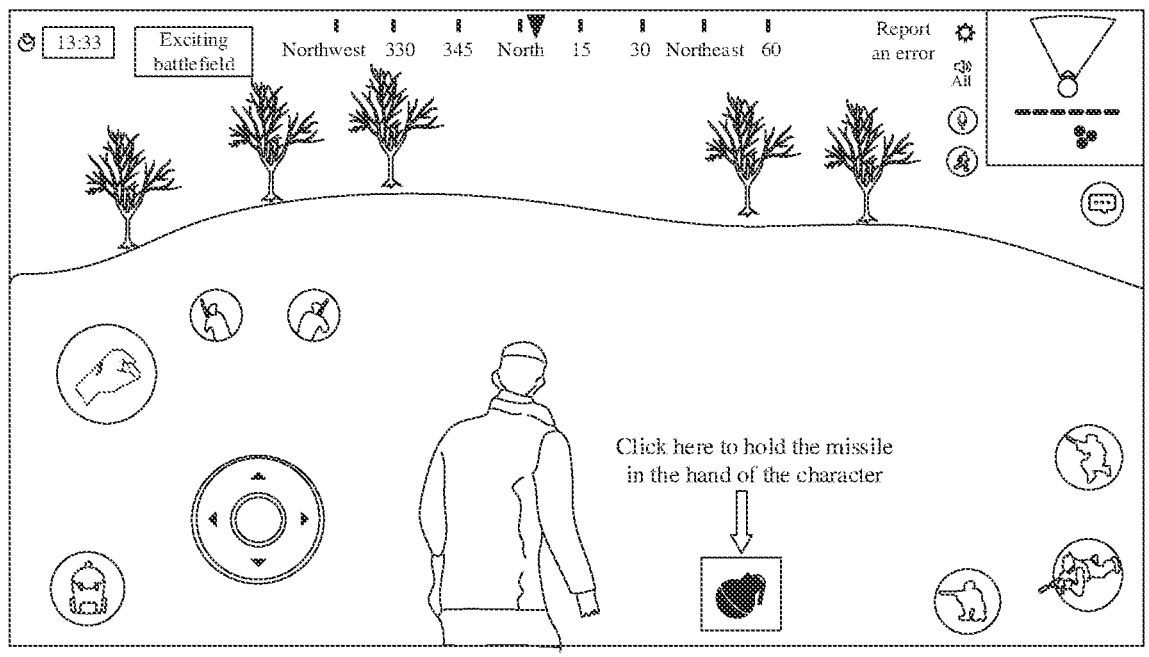
FIG. 4 is a schematic diagram of a pickup button according to an embodiment of this disclosure.

In a possible implementation, referring to FIG. 4, the terminal displays, in the virtual scene, a pickup button of the projectile. The terminal controls the virtual object to pick up the projectile and displays a dynamic image of the virtual object picking up the projectile, in response to detecting a confirmation operation on the pickup button.

The confirmation operation may be a clicking operation, a long-press operation, or the like, on the pickup button. When the terminal displays the pickup button, a prompt message may further be displayed to prompt the user to perform the confirmation operation on the pickup button. For example, the prompt information is "Click here to hold the projectile in the hand of the character".

The projectile that can be picked up by the virtual object may be a projectile that is owned by the virtual object, or may be a projectile that is currently located near the virtual object without an owner.

For example, from the perspective of the virtual items, the terminal may establish an attribution relationship table. The attribution relationship table includes virtual objects to which the virtual items belong. From the perspective of the virtual objects, the terminal may establish an item library of a virtual object. The virtual items belonging to the virtual object may all be considered to be stored in the item library.

Then, when the terminal opens the item library of the virtual object according to a user operation, the virtual items belonging to the virtual object are displayed, and the pickup buttons of the projectiles are displayed. The virtual object is controlled to pick up the projectile in response to detecting a confirmation operation of the user on the pickup button.

Alternatively, the terminal controls the virtual object to move in the virtual scene according to a user operation, and displays a virtual scene within a preset range. In a case that a projectile is located within the preset range and it is determined according to the attribution relationship table that the projectile has no owner, the pickup button of the projectile may be displayed. The virtual object may be controlled to pick up the projectile in response to detecting the confirmation operation of the user on the pickup button.

Certainly, this embodiment of this disclosure is described merely by using picking up one projectile as an example. The item library of the virtual object or the virtual scene within the preset range may include one or more projectiles. A picking process of each projectile is similar to that of this projectile, and is not repeated herein.

The dynamic image displaying the virtual object picking up the projectile may be a dynamic image of the projectile moving into the hand of the virtual object, or may be a dynamic image of the virtual object bending over to pick up the projectile. Thus simulating an effect of people picking up an item in a real scene, making the screen more realistic and vivid.

302. The Terminal Determines a Position of the Projectile as an Initial Position, and Determines a Shooting Direction of a Camera of the Virtual Scene as a Throwing Direction of the Projectile.

In the process of controlling the virtual object to pick up the projectile, the terminal may track the position of the projectile according to the displayed dynamic image. After the virtual object picks up the projectile, the position of the projectile is determined as the initial position of a motion trajectory of the projectile.

Alternatively, the terminal may further determine a position in a preset relative position relationship with the virtual object as the position of the projectile, and use this position as the initial position of the motion trajectory of the projectile.

In a possible implementation, the preset relative position relationship may be that the projectile is at the position of the virtual object and that a height of the projectile is a preset value. In this case, the terminal obtains three-dimensional coordinates of the virtual object in the virtual scene, updates the Z-axis coordinates in the three-dimensional coordinates to preset values, and determines the updated three-dimensional coordinates as coordinates of the initial position. The preset values may be determined according to a height of a hand after people pick up an item under normal circumstances, to simulate an effect that the projectile is on the virtual object and in the hand of the virtual object.

Alternatively, the preset relative position relationship may be that the projectile is on the right rear side of the virtual object, is at a preset angle to the virtual object, is at a preset distance from the virtual object, and the height of the projectile is a preset value. In this case, the terminal obtains the three-dimensional coordinates of the virtual object in the virtual scene. A projection point of the three-dimensional coordinates in the horizontal plane is moved to the right rear side according to the preset angle and the preset distance. The X-axis coordinate and Y-axis coordinate of the moved position are used as the X-axis coordinate and Y-axis coordinate of the projectile. The Z-axis coordinate of the projectile is determined as a preset value, to determine the coordinates of the initial position. The preset angle and the preset distance may be determined according to a relative position between a hand and a human body after people raise the hand under normal circumstances. The preset value may be determined according to the height of the raised hand under normal circumstances, to simulate an effect that the projectile is in the hand of the virtual object and the virtual object makes a preparation to throw the projectile. As another example, the projectile may be on the left rear side of the virtual object. There is no limitation on the preset relative position relationship between the projectile and the virtual object in this disclosure.

In another possible implementation, after the terminal controls the virtual object to pick up the projectile but before the throwing the projectile, the terminal may further control the virtual object to move in the virtual scene. Then, in a movement process of the virtual object, the position of the projectile may be tracked in real time to determine the initial position of the motion trajectory of the projectile. Alternatively, after the movement of the virtual object, the position in a preset relative position relationship with the virtual object is determined as the position of the projectile, and the position may be used as the initial position of the motion trajectory of the projectile.

In this embodiment of this disclosure, the terminal creates a camera in the virtual scene to simulate the viewing angle of the virtual object. In a case that a first-person viewing angle is used, the camera may be located near the head of the virtual object or may be located at the head of the virtual object. The virtual scene is observed from the shooting direction of the camera, which is equivalent to observing the virtual scene through the viewing angle of the virtual object. In a case that a third-person viewing angle is used, the camera may be located behind the virtual object, and the virtual scene is observed from the shooting direction of the camera.

Figure 5:
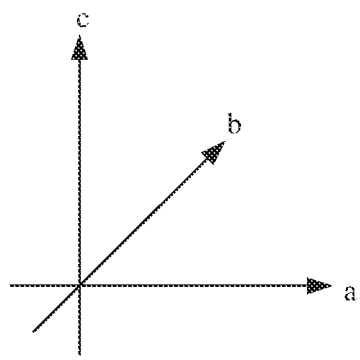
FIG. 5 is a schematic vector diagram of a shooting direction of a camera according to an embodiment of this disclosure.
Figure 6:
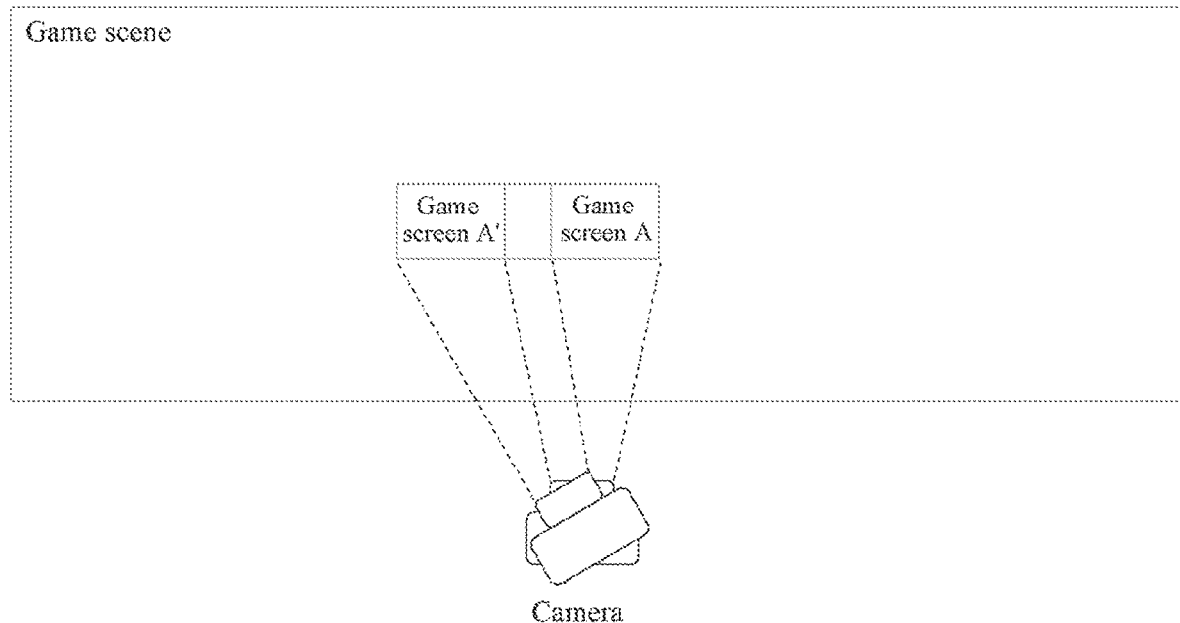
FIG. 6 is a schematic diagram of adjusting a shooting direction of a camera according to an embodiment of this disclosure.

The shooting direction may be represented in the form of a vector. Referring to FIG. 5, the position of the camera may be used as an origin of a coordinate system of the camera. The shooting direction of the camera may be represented by a vector a horizontally to the right, a front vector b and a vector c vertically upward. That is, (a, b, c) represents a vector of the shooting direction, and the vector is a unit vector, that is, $\sqrt{a^2+b^2+c^2}=1$. Motion of the camera may include: a rotation around the vector a, a rotation around the vector b, a rotation around the vector c, a scan around the vector a, translation around the vector b, or a rise and a fall around the vector c. For example, referring to FIG. 6, in a game scene, the terminal displays a game screen. When the camera rotates to the left around the vector b, the displayed game screen is switched from a game screen A to a game screen A', to simulate an effect of the virtual object turning head.

After the virtual object is controlled to pick up the projectile, it may be considered that the throwing direction of the projectile is consistent with the shooting direction of the camera. Therefore, the shooting direction of the camera in the virtual scene is determined as the throwing direction of the projectile, that is, a moving direction of the projectile in the initial position.

303. The Terminal Determines a Motion Trajectory of the Projectile According to the Initial Position, the Throwing Direction, an Initial Throwing Speed of the Projectile, and a Motion Law of an Object Under the Influence of Gravity Acceleration, So That the Motion Trajectory is a Curve Conforming to the Motion Law (or Law of Motion).

First, the initial throwing speed of the projectile may be a preset rate, which, for example, may be determined according to an initial rate of people throwing an object under normal circumstances. If $v_0$ represents the initial throwing speed and (a, b, c) represents the throwing direction, an initial velocity of the projectile may be determined as $(v_0 a, v_0 b, v_0 c)$ according to the initial throwing speed and the throwing direction.

Then, for example, $(x_0, y_0, z_0)$ represents the coordinates of the initial position, and the initial throwing moment is 0. Assuming that after the projectile is thrown, coordinates of the projectile during the motion are (x, y, z) and a corresponding moment is t, g representing gravity acceleration, the following formulas may be determined according to the motion law of an object under the influence of gravity acceleration:

$$x = x_0 + v_0 at; \quad (1)$$

$$y = y_0 + v_0 bt; \quad (2)$$

$$z = z_0 + v_0 ct - \frac{1}{2}gt^2; \quad (3)$$

$$t = \frac{x - x_0}{v_0 a}$$

is substituted into the last two formulas (2) and (3) to obtain the following formula:

$$\begin{cases} y = y_0 + v_0 b \dfrac{x - x_0}{v_0 a} \\ z = z_0 + v_0 c \dfrac{x - x_0}{v_0 a} - \dfrac{1}{2}g\left(\dfrac{x - x_0}{v_0 a}\right)^2 \end{cases} \quad (4)$$

That is, the terminal can use the foregoing formula to determine the motion trajectory of the projectile.

Furthermore, it is considered that after the projectile is thrown, if the projectile hits an obstacle in the virtual scene during the motion, the projectile stops moving and the motion trajectory is terminated. Therefore, the terminal can use the following steps to determine the end position of the motion trajectory:

3031. Obtain a plurality of preset moments, a time interval between any two adjacent preset moments being a preset duration.

For example, if t represents the preset moment, the preset duration being 0.01 seconds, the obtained plurality of preset moments are t=0, t=0.01, t=0.02, and so on. During implementation, the preset duration may be determined according to requirements of accuracy and algorithm complexity.

3032. Determine a position of the projectile at each preset moment according to the initial position, the throwing direction, the initial throwing speed, and the motion law. Then, for each preset moment, the terminal uses the foregoing formulas (1), (2), (3) to calculate the x, y, and z coordinates of the positions of the projectile at the corresponding preset moments, respectively.

3033. Determine a second position as the end position of the motion trajectory if a first position of the projectile at a first preset moment is not within an obstacle area of the virtual scene, and the second position of the projectile at a second preset moment is within the obstacle area of the virtual scene, the second preset moment being a next moment of the first preset moment.

The terminal may obtain obstacle configuration data of the virtual scene, and the obstacle configuration data includes each obstacle area, such as a ground area, a mountain area, a target area, which are areas including various types of obstacles. Then, after the position of the projectile at each preset moment is calculated, it can be determined whether the position is within an obstacle area in the virtual scene. If the position is not within the obstacle area in the virtual scene, it indicates that the projectile is still in motion at the corresponding preset moment; if the position is within the obstacle area in the virtual scene, it indicates that the projectile has hit the obstacle and stopped moving at the corresponding preset moment. Therefore, when the terminal determines that the first position of the projectile at the first preset moment is not within the obstacle area of the virtual scene and the second position of the projectile at the second preset moment is within the obstacle area of the virtual scene, the second preset moment being the next moment of the first preset moment, it indicates that the projectile hits the obstacle for the first time in the second position at the second preset moment, then the second position is determined as the end position of the motion trajectory.

Based on the above description, the terminal may determine the motion trajectory of the projectile using the following formula:

$$\begin{cases} y = y_0 + v_0 b \dfrac{x - x_0}{v_0 a} \\ z = z_0 + v_0 c \dfrac{x - x_0}{v_0 a} - \dfrac{1}{2}g\left(\dfrac{x - x_0}{v_0 a}\right)^2 \end{cases} \min(x_0, x_l) \le x \le \max(x_0, x_l)$$

$x_l$ representing a coordinate of the second position on the X axis of the virtual scene. That is, the position on the X axis that the projectile stops moving. A motion trajectory determined in the foregoing manner is a parabola, and conforms to the motion law of an object under the influence of gravity acceleration.

304. The Terminal Displays, in the Virtual Scene, the Motion Trajectory, and Performs Step 305 or 307.

The motion trajectory includes the initial position and the end position. The terminal may display the motion trajectory from the initial position to the end position in the virtual scene.

In a possible implementation, after controlling the virtual object to pick up the projectile, the terminal may display, in the virtual scene, a throw button of the projectile, and display, in the virtual scene, the motion trajectory in response to detecting a press operation on the throw button.

For example, after controlling the virtual object to pick up the projectile, the terminal displays, in the virtual scene, the throw button of the projectile, performs the foregoing steps 302 and 303 to determine the motion trajectory of the projectile, and then displays, in the virtual scene, the motion trajectory in response to detecting the press operation on the throw button. Alternatively, after controlling the virtual object to pick up the projectile, the terminal displays, in the virtual scene, the throw button of the projectile, performs the foregoing steps 302 and 303 to determine the motion trajectory of the projectile in response to detecting the press operation on the throw button, and displays, in the virtual scene, the motion trajectory.

Figure 7:
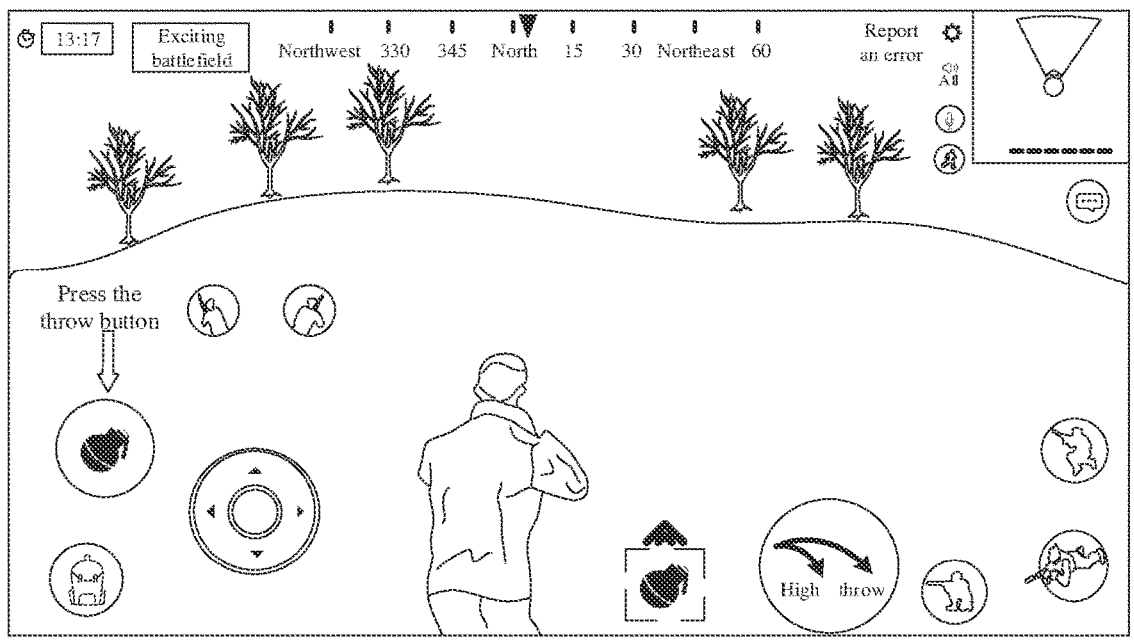
FIG. 7 is a schematic diagram of a throw button according to an embodiment of this disclosure.
Figure 8:
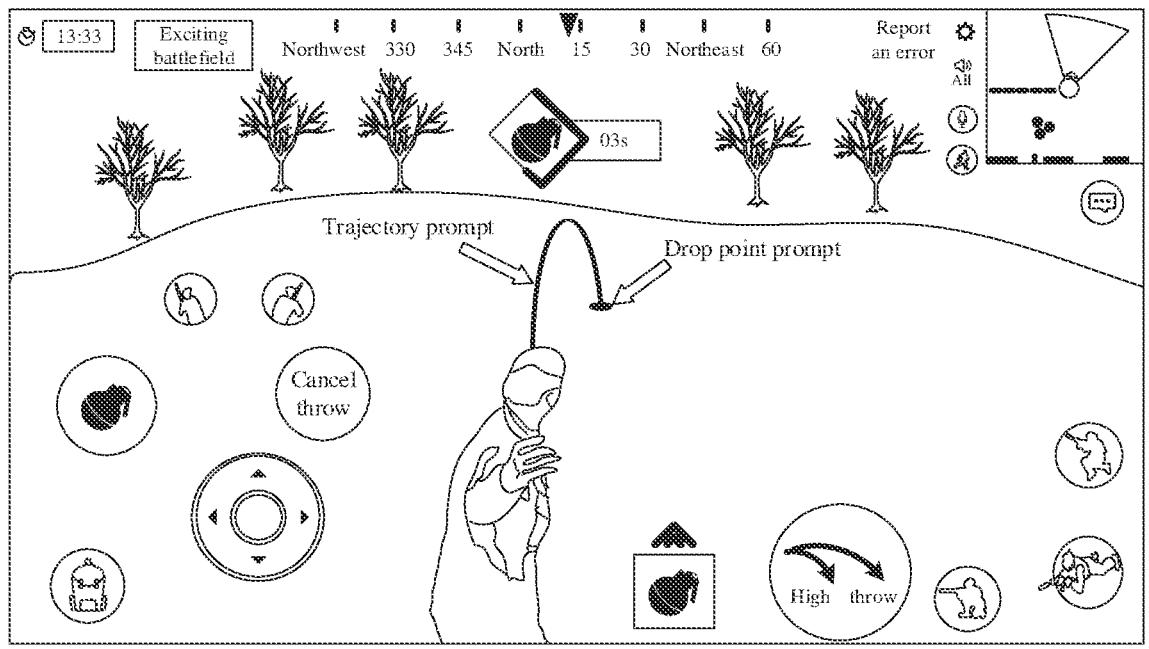
FIG. 8 is a schematic diagram of a motion trajectory and an end position thereof according to an embodiment of this disclosure.

Referring to FIG. 7 and FIG. 8, when the user presses the throw button on the left, the terminal displays the motion trajectory of the projectile, and prompts the motion trajectory and the end position. The user may check the motion trajectory and learn in advance, according to the motion trajectory, what the motion trajectory of the projectile is like and where the projectile falls, to learn whether the throwing direction is correct, and to determine whether to perform the throwing operation on the projectile or adjust the throwing direction.

305. The Terminal Adjusts, in Response to Detecting a Direction Adjustment Operation, the Shooting Direction of the Camera According to the Direction Adjustment Operation, and Determines an Adjusted Shooting Direction of the Camera as an Adjusted Throwing Direction of the Projectile.

When the user hopes to adjust the throwing direction of the projectile, the direction adjustment operation may be performed to adjust the shooting direction of the camera, and the adjusted shooting direction of the camera is determined as the adjusted throwing direction of the projectile.

The terminal may display a viewing angle adjustment control when displaying the virtual scene. The user may perform a direction adjustment operation through the viewing angle adjustment control to control the shooting direction of the camera to rotate clockwise or counterclockwise, to adjust the throwing direction of the projectile. The direction adjustment operation may be a press operation. When the user performs the press operation on the viewing angle adjustment control of the terminal, the terminal may determine an adjustment angle of the shooting direction based on a position of the press operation in the viewing angle adjustment control, and pressing force and pressing time of the press operation.

Alternatively, the direction adjustment operation may further be a rotation or tilt operation on the terminal. For example, when detecting the rotation operation, the terminal determines the adjustment angle of the shooting direction according to a rotation direction, a rotation angle, and a rotation speed of the rotation operation.

Alternatively, the direction adjustment operation may further be a sliding operation when pressing the throw button by the user. When detecting the sliding operation, the terminal determines the adjustment angle of the shooting direction according to a sliding direction and a sliding distance of the sliding operation. Certainly, the direction adjustment operation may alternatively be another operation such as a key-pressing operation, or a toggle operation on a control device connected to the terminal such as a joystick.

306. The Terminal Redetermines the Motion Trajectory of the Projectile According to the Initial Position, the Adjusted Throwing Direction, the Initial Throwing Speed, and the Motion Law, and Displays, in the Virtual Scene, a Redetermined Motion Trajectory.

After adjusting the throwing direction, the terminal redetermines the motion trajectory of the projectile and displays the redetermined motion trajectory in a manner similar to that of the foregoing step 303 according to the adjusted throwing direction.

Figure 9:
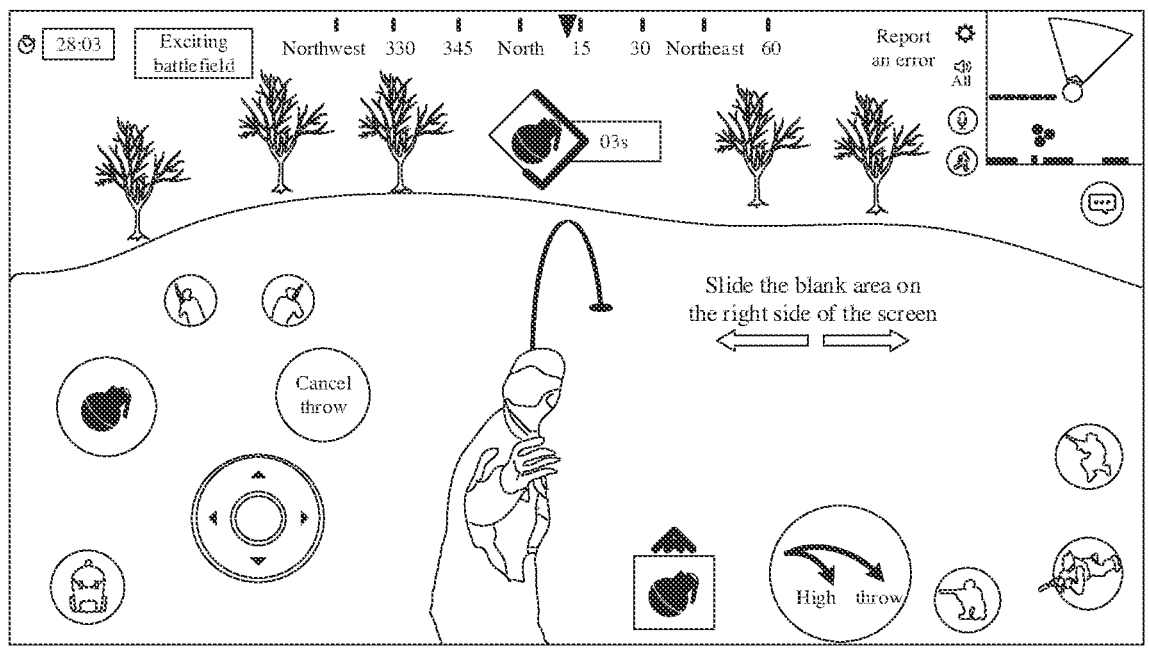
FIG. 9 is a schematic diagram of prompt information of a direction adjustment operation according to an embodiment of this disclosure.
Figure 10:
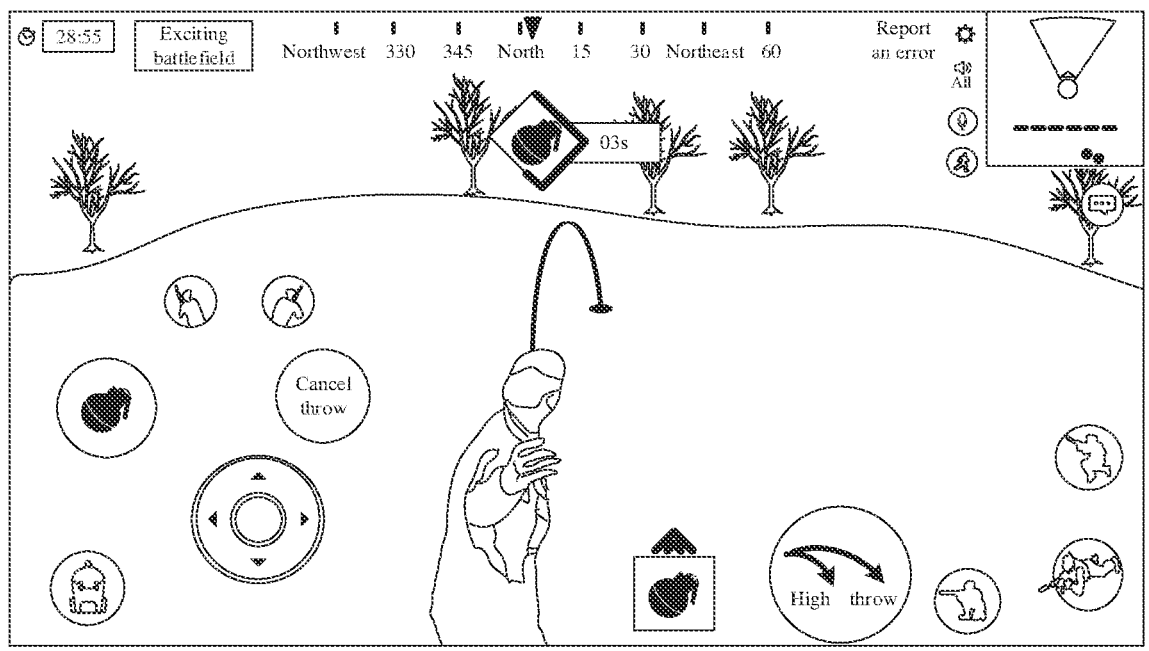
FIG. 10 is a schematic diagram of an adjusted motion trajectory according to an embodiment of this disclosure.

Referring to FIG. 9, in a case that the user presses the throw button, the terminal displays the motion trajectory of the projectile, and displays prompt information "Slide the blank area on the right side of the screen" to prompt the user to adjust the throwing direction. When the user slides to the left on the display, the camera rotates to the left, and a virtual scene taken after the rotation and the redetermined motion trajectory that are shown in FIG. 10 are displayed. It can be seen from comparison between FIG. 9 and FIG. 10 that the screen of the virtual scene moves to the left, and the end position of the motion trajectory also moves to the left.

307. The Terminal Controls the Virtual Object to Perform a Throwing Operation on the Projectile and Displays a Dynamic Image of the Projectile Moving to the End Position of the Motion Trajectory Along the Motion Trajectory.

Based on the foregoing possible implementation of step 304, the terminal displays, in the virtual scene, the motion trajectory in response to detecting the press operation on the throw button. When determining that the motion trajectory meets a requirement, the user may release the throw button. The terminal controls the virtual object to perform the throwing operation on the projectile and displays the dynamic image of the projectile moving to the end position of the motion trajectory along the motion trajectory, in response to detecting a release operation on the throw button.

In addition, when the projectile reaches the end position, a dynamic image of the projectile acting on the obstacle may further be displayed. For example, if the projectile is a grenade, when the grenade reaches a position on a ground, a dynamic image of the grenade exploding is displayed in the position.

Step 307 may be performed after step 304, or may be performed after step 306. This may be determined according to whether the user performs a direction adjustment operation. Alternatively, the terminal may further perform step 307 in other cases. For example, the terminal automatically performs step 307 after the terminal displays that the motion trajectory is completed, or automatically performs step 307 when it is detected that the virtual object is attacked by another virtual object.

According to the method provided in this embodiment of this disclosure, the virtual object is controlled to pick up the projectile in the virtual scene. The position of the projectile is determined as the initial position, and the shooting direction of the camera of the virtual scene is determined as the throwing direction of the projectile. According to the initial position, the throwing direction, the initial throwing speed of the projectile, and the motion law of an object under the influence of gravity acceleration, the motion trajectory of the projectile is determined, so that the motion trajectory is a curve conforming to the motion law, and the motion trajectory is displayed in the virtual scene. The determined motion trajectory takes into account the influence of gravity, and conforms to the motion law of an object under the influence of gravity acceleration, so that accuracy is improved, and an effect of simulating a real scene can be achieved.

In addition, a plurality of preset moments are obtained and positions of the projectile at the preset moments are compared, so that a position where the projectile first hits an obstacle is determined as an end position of the motion trajectory. An accurate end position of the motion trajectory can be determined, and an effect of a thrown object hitting the obstacle can be simulated, making the scene more real and vivid.

In addition, when a user performs a direction adjustment operation, the throwing direction of the projectile can be adjusted according to the direction adjustment operation, and the motion trajectory of the projectile can be further adjusted, so that flexible adjustment of the motion trajectory is implemented and requirements of a user can be met.

Figure 11:
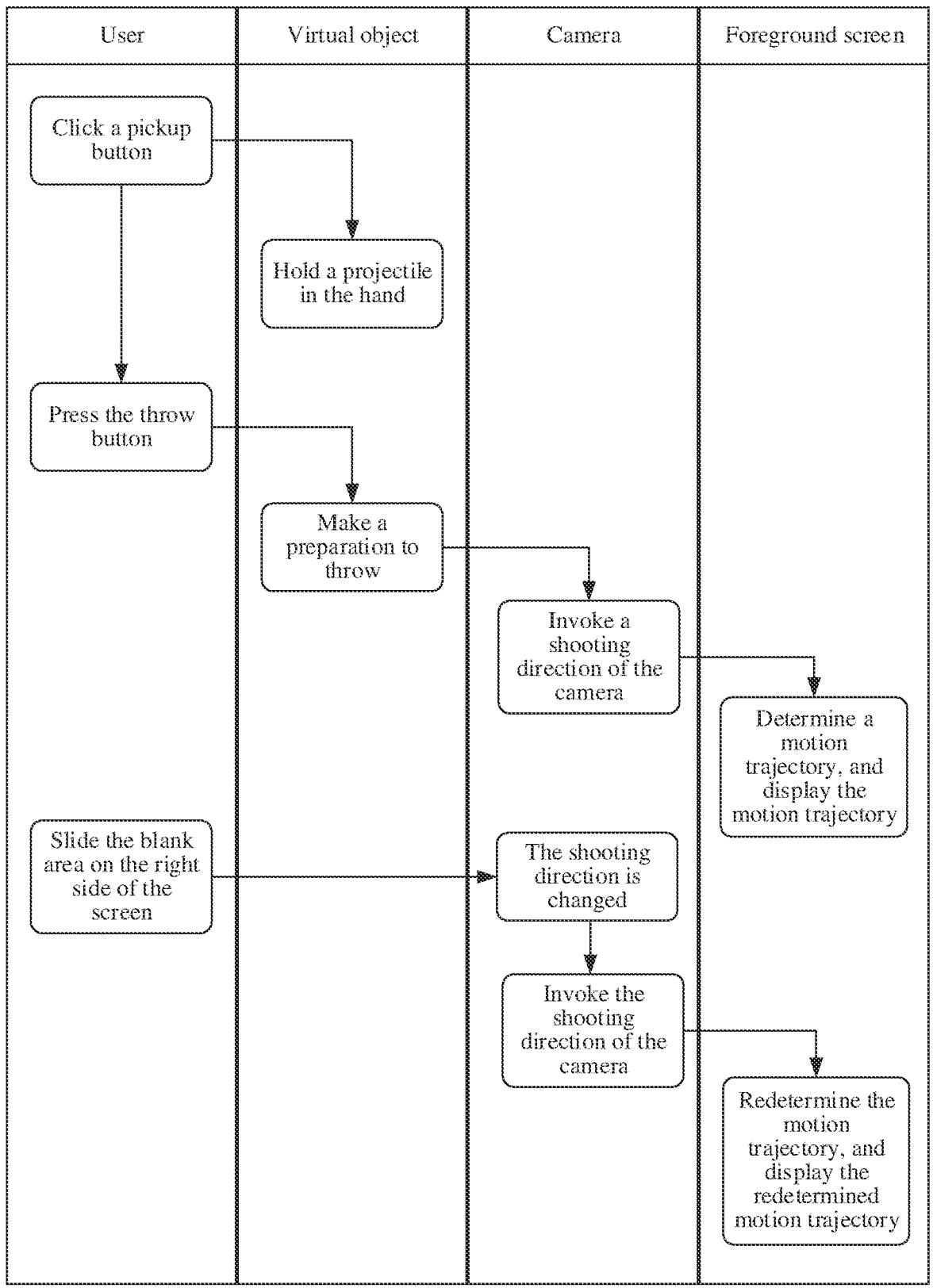
FIG. 11 is a schematic diagram of an operation process according to an embodiment of this disclosure.

FIG. 11 is a schematic diagram of an operation process according to an embodiment of this disclosure. Referring to FIG. 11, the operation process includes the following steps:

1101. A terminal displays a pickup button of a projectile, and after a user clicks a pickup button, the terminal controls a virtual object to hold the projectile in the hand.

1102. The terminal displays a throw button of the projectile, and after the user presses the throw button, the terminal displays a dynamic image of the virtual object preparing to throw the projectile, then invokes a shooting direction of a camera to determine a motion trajectory of the projectile, and displays the motion trajectory.

1103. The user performs a sliding operation on a blank area on the right side of a display, and the terminal adjusts the shooting direction of the camera according to the sliding operation, to further adjust a throwing direction of the projectile, to redetermine the motion trajectory, and displays the redetermined motion trajectory.

1104. After the user releases the throw button, the terminal controls the virtual object to throw the projectile and displays a dynamic image of the projectile moving to an end position along the motion trajectory.

This embodiment of this disclosure provides a method for determining the motion trajectory. According to the method, the motion trajectory and the end position of the projectile may be presented in the virtual scene by drawing lines in advance, so that the user may predict in advance the motion trajectory of the projectile when performing the throwing operation on the projectile according to a current throwing direction. In addition, the user may further adjust the throwing direction and change the motion trajectory and the end position of the projectile.

Figure 12:
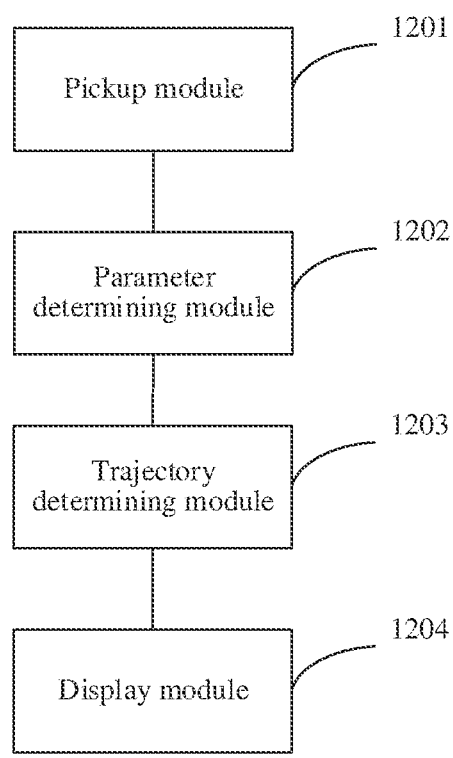
FIG. 12 is a schematic structural diagram of an apparatus for controlling a virtual object to interact with a projectile according to an embodiment of this disclosure.

FIG. 12 is a schematic structural diagram of an apparatus for controlling a virtual object to interact with a projectile according to an embodiment of this disclosure. Referring to FIG. 12, the apparatus is applied to a terminal and includes:
- a pickup module 1201, configured to perform the step of controlling the virtual object to pick up the projectile in a virtual scene in the foregoing embodiment;
- a parameter determining module 1202, configured to perform the step of determining an initial position and a throwing direction in the foregoing embodiment;
- a trajectory determining module 1203, configured to perform the step of determining a motion trajectory of the projectile according to the initial position, the throwing direction, an initial throwing speed of the projectile, and a motion law of an object under the influence of gravity acceleration in the foregoing embodiment; and
- a display module 1204, configured to perform the step of displaying the motion trajectory in the virtual scene in the foregoing embodiment.

Optionally, the trajectory determining module 1203 is further configured to perform the step of determining the motion trajectory of the projectile using the following formula in the foregoing embodiment:

$$\begin{cases} y = y_0 + v_0 b \dfrac{x - x_0}{v_0 a} \\ z = z_0 + v_0 c \dfrac{x - x_0}{v_0 a} - \dfrac{1}{2} g \left( \dfrac{x - x_0}{v_0 a} \right)^2 \end{cases} \min(x_0, x_l) \le x \le \max(x_0, x_l).$$

Optionally, the apparatus further includes:
- a moment determining module, configured to perform the step of obtaining a plurality of preset moments in the foregoing embodiment;
- a position determining module, configured to perform the step of determining a position of the projectile at each preset moment according to the initial position, the throwing direction, the initial throwing speed, and the motion law in the foregoing embodiment; and
- an end position determining module, configured to perform the step of determining a second position as the end position of the motion trajectory if a first position of the projectile at a first preset moment is not within an obstacle area of the virtual scene and the second position of the projectile at a second preset moment is within the obstacle area of the virtual scene in the foregoing embodiment.

Optionally, the display module 1204 includes:
- a button display unit, configured to perform the step of displaying, in the virtual scene, a throw button of the projectile in the foregoing embodiment; and
- a trajectory display unit, configured to perform the step of displaying, in the virtual scene, the motion trajectory, in response to detecting a press operation on the throw button in the foregoing embodiment.

Optionally, the display module 1204 further includes:
- a throwing operation module, configured to perform the step of controlling the virtual object to perform a throwing operation on the projectile and displaying a dynamic image of the projectile moving to the end position of the motion trajectory along the motion trajectory, in response to detecting a release operation on the throw button in the foregoing embodiment.

When the apparatus for controlling a virtual object to interact with a projectile provided in the foregoing embodiment controls the virtual object to interact with the projectile, only division of the foregoing functional modules is used as an example for description. In the practical application, the functions may be allocated to and completed by different functional modules according to requirements. That is, an internal structure of the terminal is divided into different functional modules, to complete all or some of the functions described above. In addition, the apparatus for controlling a virtual object to interact with a projectile provided in the foregoing embodiment and the method embodiment for controlling a virtual object to interact with a projectile belong to the same concept. For a specific implementation process of the apparatus, refer to the method embodiment for details. Details are not described herein again.

Figure 13:
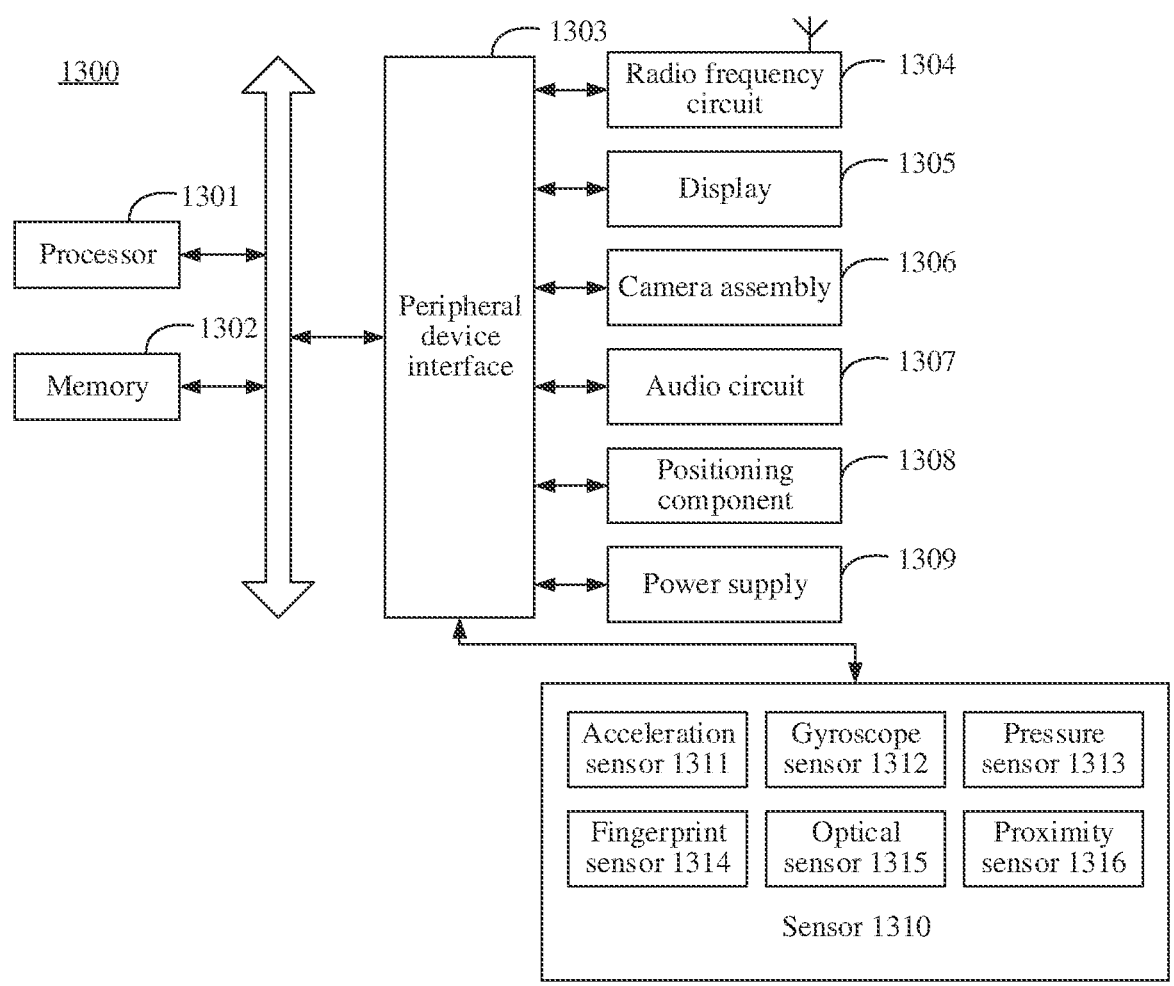
FIG. 13 is a schematic structural diagram of a terminal according to an embodiment of this disclosure.

FIG. 13 is a structural block diagram of a terminal 1300 according to an exemplary embodiment of this disclosure. The terminal 1300 may be a portable mobile terminal, for example, a smartphone, a tablet computer, a Moving Picture Experts Group Audio Layer III (MP3) player, a Moving Picture Experts Group Audio Layer IV (MP4) player, a notebook computer, or a desktop computer. The terminal 1300 may also be referred to as another name such as user equipment, a portable terminal, a laptop terminal, or a desktop terminal.

Generally, the terminal 1300 includes a processor 1301 and a memory 1302.

The processor 1301 may include one or more processing cores, for example, a 4-core processor or an 8-core processor. The processor 1301 may be implemented by using at least one hardware form of digital signal processing (DSP), a field-programmable gate array (FPGA), and a programmable logic array (PLA). The processor 1301 may alternatively include a main processor and a coprocessor. The main processor is configured to process data in an awake state, also referred to as a central processing unit (CPU), and the coprocessor is a low-power processor configured to process data in a standby state. In some embodiments, the processor 1301 may be integrated with a graphics processing unit (GPU). The GPU is configured to be responsible for rendering and drawing content that a display needs to display. In some embodiments, the processor 1301 may further include an artificial intelligence (AI) processor. The AI processor is configured to process a calculation operation related to machine learning.

The memory 1302 may include one or more non-transitory computer-readable storage media. The non-transitory computer-readable storage medium may be non-transient. The memory 1302 may further include a high-speed random access memory and a non-volatile memory such as one or more magnetic disk storage devices and a flash storage device. In some embodiments, the non-transitory computer-readable storage medium in the memory 1302 is configured to store at least one instruction. The at least one instruction is executed by the processor 1301 to implement the method for controlling a virtual object to interact with a projectile provided in the method embodiment in this application.

In some embodiments, the terminal 1300 may further optionally include a peripheral device interface 1303 and at least one peripheral device. The processor 1301, the memory 1302, and the peripheral device interface 1303 may be connected through a bus or a signal cable. Each peripheral device may be connected to the peripheral device interface 1303 through a bus, a signal cable, or a circuit board. Specifically, the peripheral device includes: at least one of a radio frequency circuit 1304, a touch display 1305, a camera assembly 1306, an audio circuit 1307, a positioning component 1308, and a power supply 1309.

The peripheral device interface 1303 may be configured to connect at least one peripheral device related to input/output (I/O) to the processor 1301 and the memory 1302. In some embodiments, the processor 1301, the memory 1302, and the peripheral device interface 1303 are integrated into a same chip or circuit board; in some other embodiments, any one or two of the processor 1301, the memory 1302, and the peripheral device interface 1303 may be implemented on an independent chip or circuit board. This is not limited in this embodiment.

The radio frequency circuit 1304 is configured to receive and transmit a radio frequency (RF) signal, also referred to as an electromagnetic signal. The radio frequency circuit 1304 communicates with a communications network and another communications device by using the electromagnetic signal. The radio frequency circuit 1304 may convert an electric signal into an electromagnetic signal for transmission, or convert a received electromagnetic signal into an electric signal. Optionally, the radio frequency circuit 1304 includes: an antenna system, an RF transceiver, one or more amplifiers, a tuner, an oscillator, a digital signal processor, a codec chip set, a subscriber identity module card, and the like. The radio frequency circuit 1304 may communicate with another terminal through at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the radio frequency circuit 1304 may further include a near field communication (NFC) related circuit, and is not limited in this application.

The display 1305 is configured to display a user interface (UI). The UI may include a graph, a text, an icon, a video, and any combination thereof. When the display 1305 is a touch display, the display 1305 is further capable of acquiring a touch signal on or above a surface of the display 1305. The touch signal may be input to the processor 1301 for processing as a control signal. In this case, the touch display 1305 may be further configured to provide a virtual button and/or a virtual keyboard, which is also referred to as a soft button and/or a soft keyboard. In some embodiments, there may be one touch display 1305, disposed on a front panel of the terminal 1300. In some other embodiments, there may be at least two touch displays 1305, disposed on different surfaces of the terminal 1300 respectively or in a folded design. In still other embodiments, the touch display 1305 may be a flexible display, disposed on a curved surface or a folded surface of the terminal 1300. Even, the touch display 1305 may be further set in a non-rectangular irregular pattern, namely, a special-shaped screen. The touch display 1305 may be prepared by using materials such as a liquid crystal display (LCD), an organic light-emitting diode (OLED), or the like.

The camera assembly 1306 is configured to acquire an image or a video. Optionally, the camera assembly 1306 includes a front-facing camera and a rear-facing camera. Generally, the front-facing camera is disposed on a front panel of the terminal, and the rear-facing camera is disposed on a back surface of the terminal. In some embodiments, there are at least two rear-facing cameras, which are respectively any one of a main camera, a depth of field camera, a wide-angle camera, and a telephoto camera, to implement a background blurring function by fusing the main camera and the depth of field camera, and panoramic shooting and virtual reality (VR) shooting functions or other fusing shooting functions by fusing the main camera and the wide-angle camera. In some embodiments, the camera assembly 1306 may further include a flash. The flash may be a single color temperature flash, or may be a double color temperature flash. The double color temperature flash is a combination of a warm light flash and a cold light flash, and may be used for light compensation under different color temperatures.

The audio circuit 1307 may include a microphone and a speaker. The speaker is configured to collect sound waves of a user and an environment, and convert the sound waves into electric signals and input the electrical signals into the processor 1301 for processing, or input the electrical signals into the radio frequency circuit 1304 to implement speech communication. For the purpose of stereo sound collection or noise reduction, there may be a plurality of microphones, respectively disposed at different parts of the terminal 1300. The microphone may be further an array microphone or an omnidirectional collection microphone. The speaker is configured to convert electric signals from the processor 1301 or the radio frequency circuit 1304 into sound waves. The speaker may be a conventional thin-film speaker or a piezoelectric ceramic speaker. In a case that the speaker is the piezoelectric ceramic speaker, electric signals not only can be converted into sound waves that can be heard by human, but also can be converted into sound waves that cannot be heard by human for ranging and the like. In some embodiments, the audio circuit 1307 may further include an earphone jack.

The positioning component 1308 is configured to position a current geographic location of the terminal 1300, to implement a navigation or a location based service (LBS). The positioning component 1308 may be a positioning component based on the Global Positioning System (GPS) of the United States, the BeiDou system of China, the GLONASS System of Russia, or the GALILEO System of the European Union.

The power supply 1309 is configured to supply power for various components in the terminal 1300. The power supply 1309 may be an alternating current, a direct current, a disposable battery, or a rechargeable battery. When the power supply 1309 includes the rechargeable battery, the rechargeable battery may be a wired rechargeable battery or a wireless rechargeable battery. The rechargeable battery may be further configured to support a fast charge technology.

In some embodiments, the terminal 1300 further includes one or more sensors 1310. The one or more sensors 1310 include, but are not limited to: an acceleration sensor 1311, a gyroscope sensor 1312, a pressure sensor 1313, a fingerprint sensor 1314, an optical sensor 1315, and a proximity sensor 1316.

The acceleration sensor 1311 may detect acceleration on three coordinate axes of a coordinate system established by the terminal 1300. For example, the acceleration sensor 1311 may be configured to detect components of gravity acceleration on the three coordinate axes. The processor 1301 may control, according to a gravity acceleration signal collected by the acceleration sensor 1311, the touch display 1305 to display the user interface in a frame view or a portrait view. The acceleration sensor 1311 may be further configured to collect game or user motion data.

The gyroscope sensor 1312 may detect a body direction and a rotation angle of the terminal 1300. The gyroscope sensor 1312 may cooperate with the acceleration sensor 1311 to collect a 3D action by the user on the terminal 1300. The processor 1301 may implement the following functions according to the data collected by the gyroscope sensor 1312: motion sensing (such as changing the UI according to a tilt operation of the user), image stabilization at shooting, game control, and inertial navigation.

The pressure sensor 1313 may be disposed on a side frame of the terminal 1300 and/or a lower layer of the display 1305. When the pressure sensor 1313 is disposed on the side frame of the terminal 1300, a holding signal of the user on the terminal 1300 may be detected. The processor 1301 performs left and right hand recognition or a quick operation according to the holding signal collected by the pressure sensor 1313. When the pressure sensor 1313 is disposed on the lower layer of the touch display 1305, the processor 1301 controls an operable control on the UI according to a pressure operation of the user on the touch display 1305. The operable control includes at least one of a button control, a scroll bar control, an icon control and a menu control.

The fingerprint sensor 1314 is configured to collect a fingerprint of a user, and the processor 1301 identifies an identity of the user according to the fingerprint collected by the fingerprint sensor 1314, or the fingerprint sensor 1314 identifies an identity of the user according to the collected fingerprint. When the identity of the user is identified as a trusted identity, the processor 1301 authorizes the user to perform a related sensitive operation. The sensitive operation includes unlocking a screen, viewing encrypted information, downloading software, payment, changing settings, and the like. The fingerprint sensor 1314 may be disposed on a front surface, a back surface, or a side surface of the terminal 1300. When the terminal 1300 is provided with a physical button or a vendor logo, the fingerprint sensor 1314 may be integrated with the physical button or the vendor logo.

The optical sensor 1315 is configured to collect ambient light intensity. In an embodiment, the processor 1301 may control display brightness of the touch display 1305 according to the ambient light intensity collected by the optical sensor 1315. Specifically, when the ambient light intensity is relatively high, the display brightness of the touch display 1305 is turned up. When the ambient light intensity is relatively low, the display brightness of the touch display 1305 is turned down. In another embodiment, the processor 1301 may further dynamically adjust a camera parameter of the camera assembly 1306 according to the ambient light intensity collected by the optical sensor 1315.

The proximity sensor 1316, also referred to as a distance sensor, is usually disposed on the front panel of the terminal 1300. The proximity sensor 1316 is configured to collect a distance between a user and the front surface of the terminal 1300. In an embodiment, when the proximity sensor 1316 detects that the distance between the user and the front surface of the terminal 1300 gradually becomes smaller, the touch display 1305 is controlled by the processor 1301 to switch from a screen-on state to a screen-off state. In a case that the proximity sensor 1316 detects that the distance between the user and the front surface of the terminal 1300 gradually becomes larger, the touch display 1305 is controlled by the processor 1301 to switch from the screen-off state to the screen-on state.

A person skilled in the art may understand that the structure shown in FIG. 13 does not constitute a limitation to the terminal 1300, and the terminal may include more or fewer components than those shown in the figure, or some components may be combined, or a different component deployment may be used.

An embodiment of this disclosure further provides a non-transitory computer-readable storage medium. The non-transitory computer-readable storage medium stores at least one instruction, at least one program, a code set, or an instruction set. The instruction, the program, the code set, or the instruction set is loaded by a processor and has operations to implement the method for controlling a virtual object to interact with a projectile in the foregoing embodiment.

A person of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, and the like.

The foregoing descriptions are merely exemplary embodiments of this disclosure, but are not intended to limit this application. Any modification, equivalent replacement, or improvement made within the spirit and principle of this application shall fall within the protection scope of this application.

What is claimed is:

1. A method for controlling a virtual object to interact with a projectile in a virtual scene, applied to a terminal, the method comprising:
   determining a shooting direction of a camera of the virtual scene as a throwing direction of a projectile controlled by the virtual object;
   determining an initial position of the projectile via:
      projecting the projectile to a horizontal plane of a three-dimensional coordinates of the virtual object;
      moving the projectile to a right rear side of the virtual object by adjusting an X-axis coordinate and a Y-axis coordinate of the projectile based on a preset angle to the virtual object and preset distance from the virtual object, respectively;
      adjusting a Z-axis coordinate of the projectile based on a pre-configured value;
   determining a motion trajectory of the projectile according to the initial position, the throwing direction, an initial throwing speed of the projectile, and a motion law of an object under an influence of gravity acceleration, so that the motion trajectory conforms to the motion law;
   displaying, in the virtual scene, the motion trajectory;
   adjusting the shooting direction of the camera of the virtual scene, to obtain an adjusted throwing direction of the projectile;
   updating the motion trajectory of the projectile based on the adjusted throwing projectile; and
   displaying, in the virtual scene, an updated motion trajectory.

2. The method of claim 1, further comprising:
   adjusting a viewing angle of the virtual scene based on the adjusted shooting direction of the camera.

3. The method of claim 1, wherein adjusting the shooting direction of the camera of the virtual scene comprises is achieved via at least one of:
   a press position, a press force, or a press time of a press operation applied to a viewing angle adjustment control area of the terminal;
   a rotation or a tilt operation on the terminal; or a sliding direction, a sliding distance, and a sliding speed of a sliding operation on the terminal.

4. The method of claim 3, wherein the sliding speed and a rotation speed of shooting direction of the camera are positively correlated, and wherein the sliding distance and a rotation angle of the shooting direction of the camera are positively correlated.

5. The method of claim 1, further comprising determine the initial of the projectile via one of:
   determining the initial position as a location from which the projectile is picked up by the virtual object;
   determining the initial position based on a position of the virtual object, and adjusting a height of the initial position to be a height of a hand of the virtual object; or
   determining the initial position based on a preset angle to the virtual object and a preset distance to the virtual object.

6. The method of claim 1, further comprising:
   displaying, in the virtual scene, a dynamic image of the projectile moving to an end position of the motion trajectory along the motion trajectory.

7. The method according to claim 6, further comprising:
   controlling the virtual object to perform a throwing operation on the projectile and displaying a dynamic image of the projectile moving to an end position along the motion trajectory, wherein a movement of the projectile ends in response to the projectile colliding with an obstacle.

8. The method of claim 7, further comprising:
   in response to the projectile colliding with the obstacle, simulating, at the end position of the motion trajectory in the virtual scene, an effect of the projectile hitting the obstacle.

9. A device for controlling a virtual object to interact with a projectile in a virtual scene, the device comprising a memory for storing computer instructions and a processor in communication with the memory, wherein, when the processor executes the computer instructions, the processor is configured to cause the device to perform:
   determining a shooting direction of a camera of the virtual scene as a throwing direction of a projectile controlled by the virtual object;
   determining an initial position of the projectile via:
      projecting the projectile to a horizontal plane of a three-dimensional coordinates of the virtual object;
      moving the projectile to a right rear side of the virtual object by adjusting an X-axis coordinate and a Y-axis coordinate of the projectile based on a preset angle to the virtual object and preset distance from the virtual object, respectively;
      adjusting a Z-axis coordinate of the projectile based on a pre-configured value;
   determining a motion trajectory of the projectile according to the initial position, the throwing direction, an initial throwing speed of the projectile, and a motion law of an object under an influence of gravity acceleration, so that the motion trajectory conforms to the motion law;
   displaying, in the virtual scene, the motion trajectory;
   adjusting the shooting direction of the camera of the virtual scene, to obtain an adjusted throwing direction of the projectile;
   updating the motion trajectory of the projectile based on the adjusted throwing projectile; and
   displaying, in the virtual scene, an updated motion trajectory.

10. The device of claim 9, wherein, when the processor executes the computer instructions, the processor is configured to further cause the device to perform:
    adjusting a viewing angle of the virtual scene based on the adjusted shooting direction of the camera.

11. The device of claim 9, wherein adjusting the shooting direction of the camera of the virtual scene comprises is achieved via at least one of:
    a press position, a press force, or a press time of a press operation applied to a viewing angle adjustment control area of the device;
    a rotation or a tilt operation on the device; or
    a sliding direction, a sliding distance, and a sliding speed of a sliding operation on the device.

12. The device of claim 11, wherein the sliding speed and a rotation speed of shooting direction of the camera are positively correlated, and wherein the sliding distance and a rotation angle of the shooting direction of the camera are positively correlated.

13. The device of claim 9, wherein, when the processor executes the computer instructions, the processor is configured to further cause the device to determine the initial of the projectile via one of:
    determining the initial position as a location from which the projectile is picked up by the virtual object;
    determining the initial position based on a position of the virtual object, and adjusting a height of the initial position to be a height of a hand of the virtual object; or
    determining the initial position based on a preset angle to the virtual object and a preset distance to the virtual object.

14. The device of claim 9, wherein, when the processor executes the computer instructions, the processor is configured to further cause the device to perform:
    displaying, in the virtual scene, a dynamic image of the projectile moving to an end position of the motion trajectory along the motion trajectory.

15. The device according to claim 14, wherein, when the processor executes the computer instructions, the processor is configured to further cause the device to perform:
    controlling the virtual object to perform a throwing operation on the projectile and displaying a dynamic image of the projectile moving to an end position along the motion trajectory, wherein a movement of the projectile ends in response to the projectile colliding with an obstacle.

16. The device of claim 15, wherein, when the processor executes the computer instructions, the processor is configured to further cause the device to:
    in response to the projectile colliding with the obstacle, simulating, at the end position of the motion trajectory in the virtual scene, an effect of the projectile hitting the obstacle.

17. A non-transitory storage medium for storing computer readable instructions, the computer readable instructions, when executed by a processor in a device for controlling a virtual object to interact with a projectile in a virtual scene, causing the processor to:
    determining a shooting direction of a camera of the virtual scene as a throwing direction of a projectile controlled by the virtual object;
    determining an initial position of the projectile via:
       projecting the projectile to a horizontal plane of a three-dimensional coordinates of the virtual object;
       moving the projectile to a right rear side of the virtual object by adjusting an X-axis coordinate and a Y-axis coordinate of the projectile based on a preset angle to the virtual object and preset distance from the virtual object, respectively;

adjusting a Z-axis coordinate of the projectile based on a pre-configured value;

determining a motion trajectory of the projectile according to the initial position, the throwing direction, an initial throwing speed of the projectile, and a motion law of an object under an influence of gravity acceleration, so that the motion trajectory conforms to the motion law;

displaying, in the virtual scene, the motion trajectory;

adjusting the shooting direction of the camera of the virtual scene, to obtain an adjusted throwing direction of the projectile;

updating the motion trajectory of the projectile based on the adjusted throwing projectile; and displaying, in the virtual scene, an updated motion trajectory.

18. The non-transitory storage medium of claim 17, wherein, when the computer readable instructions, when executed by a processor, further cause the device to perform:

adjusting a viewing angle of the virtual scene based on the adjusted shooting direction of the camera.

19. The non-transitory storage medium of claim 17, wherein adjusting the shooting direction of the camera of the virtual scene comprises is achieved via at least one of:

a press position, a press force, or a press time of a press operation applied to a viewing angle adjustment control area of the device;

a rotation or a tilt operation on the device; or a sliding direction, a sliding distance, and a sliding speed of a sliding operation on the device.

20. The non-transitory storage medium of claim 19, wherein the sliding speed and a rotation speed of shooting direction of the camera are positively correlated, and wherein the sliding distance and a rotation angle of the shooting direction of the camera are positively correlated.

* * * * *